(12) United States Patent
Suchowski et al.

(10) Patent No.: US 6,305,326 B1
(45) Date of Patent: *Oct. 23, 2001

(54) COMPOSITE CHEW TOY

(75) Inventors: Bernard Suchowski, Marlboro, NJ (US); Simon Handelsman, Newburyport, MA (US)

(73) Assignee: The Hartz Mountain Corporation, Secaucus, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/560,010

(22) Filed: Apr. 27, 2000

Related U.S. Application Data

(63) Continuation of application No. 09/122,228, filed on Jul. 24, 1998, now Pat. No. 6,116,191.

(51) Int. Cl.[7] .................................................. A01K 29/00
(52) U.S. Cl. .......................... 119/709; 119/707; 119/710
(58) Field of Search .................................. 119/709, 707, 119/702, 710; 264/250; 606/235

(56) References Cited

U.S. PATENT DOCUMENTS

| | | | |
|---|---|---|---|
| D. 320,495 | 10/1991 | Pallesen | D1/110 |
| D. 337,398 | 7/1993 | Axelrod | D30/160 |
| D. 343,262 | 1/1994 | Axelrod | D30/160 |
| D. 357,952 | 5/1995 | Chen | D21/191 |
| D. 358,007 | 5/1995 | Axelrod | D30/160 |
| D. 384,985 | 10/1997 | Cronic | D21/84 |
| 2,003,958 | 6/1935 | Salisbury | 119/709 |
| 3,871,334 | 3/1975 | Axelrod | 119/710 |
| 4,513,014 | 4/1985 | Edwards | 426/132 |
| 4,674,444 | 6/1987 | Axelrod | 119/710 |
| 4,771,733 | 9/1988 | Axelrod | 119/710 |
| 4,802,444 | 2/1989 | Markham et al. | 119/710 |
| 4,919,083 | 4/1990 | Axelrod | 119/710 |
| 4,924,811 | 5/1990 | Axelrod | 119/710 |
| 4,955,914 * | 9/1990 | Caniglia et al. | 606/235 |
| 5,174,243 | 12/1992 | O'Rourke | 119/29 |
| 5,200,212 | 4/1993 | Axelrod | 426/2 |
| 5,263,436 | 11/1993 | Axelrod . | |
| 5,339,771 | 8/1994 | Axelrod | 119/710 |
| 5,419,283 | 5/1995 | Leo | 119/709 |
| 5,476,069 | 12/1995 | Axelrod | 119/709 |
| 5,485,809 | 1/1996 | Carroll | 119/710 |
| 5,595,142 | 1/1997 | Chill | 119/710 |
| 5,647,302 * | 7/1997 | Shipp | 119/709 |
| 5,766,223 * | 6/1998 | Johnson | 606/235 |
| 5,832,877 | 11/1998 | Markham | 119/710 |
| 5,857,431 | 1/1999 | Peterson | 119/710 |
| 5,912,285 | 6/1999 | Godsey | 524/17 |
| 5,941,197 | 8/1999 | Axelrod | 119/710 |
| 5,947,061 | 9/1999 | Markham et al. | 119/710 |

OTHER PUBLICATIONS

Catalog of Nylabone Products.

Sternco/Delta Products Catalog.

* cited by examiner

Primary Examiner—Charles T. Jordan
Assistant Examiner—Judith A. Nelson
(74) Attorney, Agent, or Firm—Stroock & Stroock & Lavan LLP

(57) ABSTRACT

A synthetic chew toy can be formed as a composite of two different materials. The toy can be formed with a rigid synthetic frame, supporting a softer chew portion. The chew portion can include a plurality of projections, preferably having a cylindrical shape with a hemispheric end, extending outward from a base of the chew portion. Thus, the rigidity of the frame provides structure, support and durability for the chew toy, and the relatively softer chew portion can provide beneficial effects to a pets teeth and gums, or provide greater chewing pleasure.

17 Claims, 2 Drawing Sheets

COMPOSITE CHEW TOY

CROSS-REFERENCE TO RELATED APPLICATIONS

This is a continuation of application Ser. No. 09/122,228, filed Jul. 24, 1998, now U.S. Pat. No. 6,116,191.

BACKGROUND OF THE INVENTION

The invention relates generally to chew toys for dogs and more particularly to a chew toy having a therapeutic effect on a dog's teeth and gums.

Various products exist in the market which are intended to clean a pet's teeth as the pet chews the product or to satisfy a pet's chewing urge. One type of product is an edible chew toy, made of materials such as rawhide, which is extremely hard and therefore unacceptable for certain older dogs or dogs with tooth problems. Other chew toys are formed of soft rubber materials and can exhibit unsatisfactorily high flexibility and/or unsatisfactory low durability. Other plastic products are molded from hard materials and can expose the inside of a dogs mouth to undesirably hard or sharp product. An example of a chew toy formed of a uniform synthetic material is disclosed in U.S. Pat. No. 5,263,436, the contents of which are incorporated herein by reference.

Accordingly, it is desirable to provide a synthetic chew toy for a pet, such as a dog, which overcomes shortcomings of existing chew toys.

SUMMARY OF THE INVENTION

Generally speaking, in accordance with the invention, a synthetic chew toy formed as a composite of two different materials is provided. The toy can be formed with a rigid synthetic frame, supporting a softer chew portion. The chew portion can include a plurality of projections, preferably having a cylindrical shape with a hemispheric end, extending outward from a base of the chew portion. Thus, the rigidity of the frame provides structure, support and durability for the chew toy, and the relatively softer chew portion can provide beneficial effects to a pet's teeth and gums, or provide greater chewing pleasure.

Accordingly, it is an object of the invention to provide an improved chew toy for pets, such as dogs.

Another object of the invention is to provide a chew toy for pets, having high durability.

Yet another object of the invention is to provide a chew toy for pets, having acceptable softness and flexibility.

Still other objects and advantages of the invention will in part be obvious and will in part be apparent from the specification and drawings.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
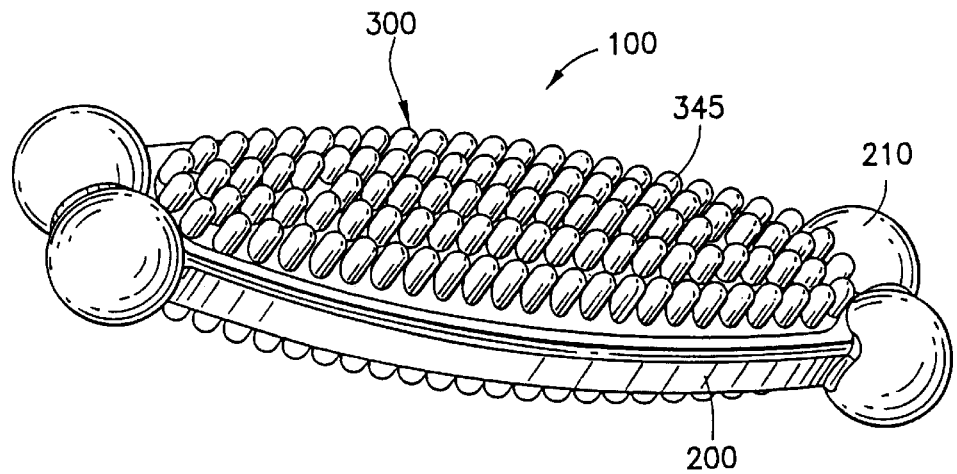
FIG. 1 is a perspective view of a chew toy constructed in accordance with a preferred embodiment of the invention.
Figure 2:
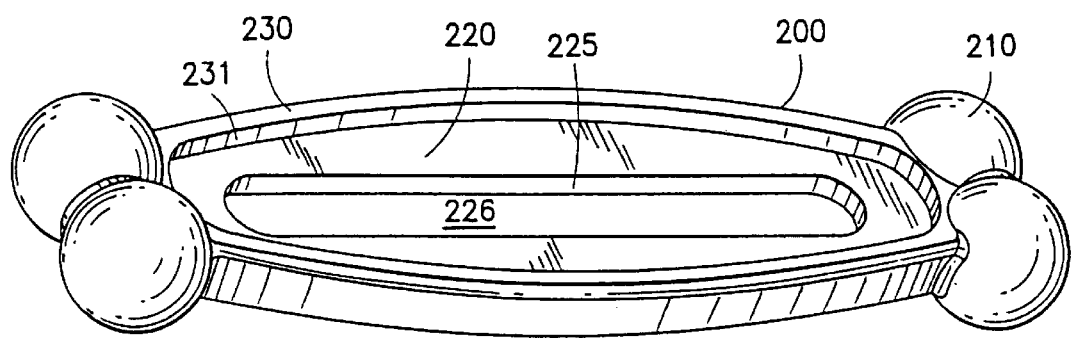
FIG. 2 is a perspective view of a frame portion of the chew toy of FIG. 1.

A chew toy constructed in accordance with one preferred embodiment of the invention is shown generally in FIGS. 1–4 as composite bone 100 and is formed with a frame 200 supporting a soft portion 300. Frame 200 includes four bulbous portions 210 at the ends thereof, to simulate a bone shape. Frame 200 also includes a support shelf 220 having an inner wall 225 defining an opening 226 in the shape of an elongated oval. Frame 200 also includes a support wall 230 surrounding and perpendicular to shelf 220, such that shelf 220 extends inward and perpendicular to an inner wall 231 of support wall 230.

Frame 200 is preferably highly rigid and provides composite bone 100 with its rigidity and durability. Frame 200 also provides composite bone 100 with a portion to simulate the hard portion of a natural bone. Frame 200 is preferably formed from a rigid, durable, non-toxic material, such as nylon, preferably 6–6 nylon. Frame portion 200 is advantageously molded to have a hardness in the range of 70 to 90, preferably 82–89, most preferably 85 Shore D hardness (Scale Shore D).

In the non-limiting embodiment exemplified by FIGS. 1–4, frame 200 is injection molded and then cooled to obtain maximum shrinkage. Thereafter, frame 200 is placed into the cavity of a second mold and the material for soft portion 300 is injection molded within the confines of the second mold and frame 200.

Figure 3:
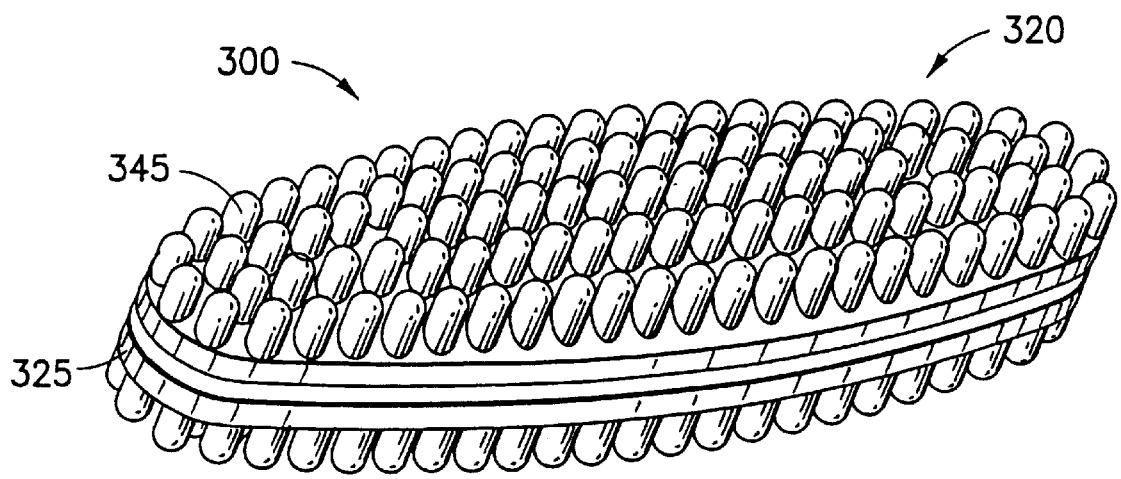
FIG. 3 is a perspective view of a soft portion of the chew toy of FIG. 1.
Figure 4:
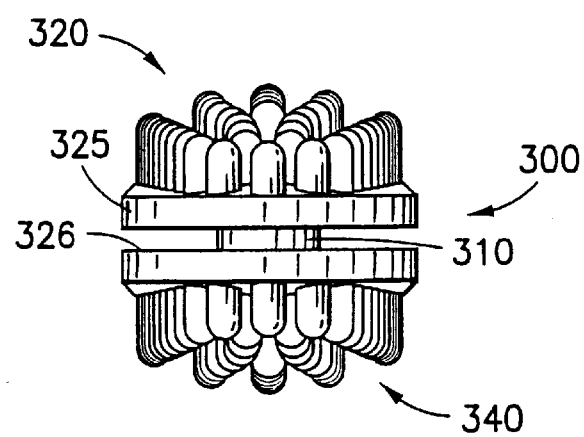
FIG. 4 is an end view of the soft portion of FIG. 3.

Soft portion 300 is formed of material which is considerably softer and more flexible than the material used to form frame 200. Referring to FIGS. 3 and 4, it can be seen that soft portion 300 includes a base 310 which fills the opening 226 defined by inner wall 225. Soft portion 300 also includes a pair of chew surfaces 320 having a pair of annular wings 325 having facing surfaces 326 which extend perpendicularly from base 310. Wings 325 fill the space defined by inner walls 231 and shelves 220 and extend perpendicular to and outward from walls 220 to form a pair of domes 340.

Each dome 340 supports a plurality of projections 345 which extend perpendicular to and in the opposite direction from facing surfaces 326. Projections 345 have a generally cylindrical shape and a hemispheric top, which presents a smooth contact surface for a dogs teeth and gums. The cylindrical shape can also enhance the ability of projections 345 to extend deep into spaces between a dogs teeth. It is believed that the combination of soft and hard portions and/or flexible projections, more closely simulate the plurality of textures encountered when chewing a natural bone containing bone, meat and gristle, and can stimulate chewing activity.

Although various resilient polymers can be used as the material to construct soft portion 300, a preferred material is polyurethane. Other natural and synthetic rubbers are also acceptable. Soft portion 300 should be molded to have a hardness in the range of 70 to 90, preferably 80–90, most preferably 85 Shore A hardness (Scale Shore A) as measured in a durameter.

Bone 100 can be formed of an assortment of additional materials, including ABS, PVC, polycarbonate and rubber. In preferred embodiments of the invention, scent and flavor additives such as cheese, beef, pork, chocolate and so on can be compounded with the material for forming frame 200 or soft portion 300 before they are molded. Preferably, the scent or flavor additive is compounded with material for forming soft portion 300.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A pet chew toy, comprising:
   a unitary and rigid frame, the frame having a first hardness; and
   a chew portion mounted on and supported by the frame in such a manner that both a portion of the frame and a portion of the chew portion are exposed to be contacted when an animal chews the toy, the chew portion having a second hardness substantially less hard than that of the first hardness.

2. The chew toy of claim 1, wherein the chew portion further comprises a first base and a second base.

3. The chew toy of claim 2, wherein the first and second bases are integrally formed.

4. The chew toy of claim 2, wherein a first portion of projections are formed on and extend from the first base and a second portion of projections are formed on and extend from the second base.

5. The chew toy of claim 4, wherein the first portion of projections are arranged concentrically in bands of decreasing diameter on the first base and the second portion of projections are arranged concentrically in bands of decreasing diameter on the second base.

6. The chew toy of claim 2, wherein the first and second bases are dome shaped.

7. The chew toy of claim 6, wherein each of the projections is substantially the same height.

8. The chew toy of claim 4, wherein each of the projections is generally cylindrical.

9. The chew toy of claim 8, wherein each projection has a hemispheric top portion.

10. The chew toy of claim 1, wherein the frame is bone shaped.

11. The chew toy of claim 10, wherein the frame further comprises a pair of bulbous members formed on opposite ends of the frame.

12. The chew toy of claim 1, wherein the frame has a Shore D hardness of about 70 or more and the chew portion has a Shore A hardness of about 90 or less.

13. The chew toy of claim 1, wherein the frame comprises nylon and the chew portion comprises polyurethane.

14. A pet chew toy, comprising:
    a unitary and rigid frame, the frame having a first hardness;
    a chew portion mounted on and supported by the frame in such a manner that both a portion of the frame and a portion of the chew portion are exposed to be contacted when an animal chews the toy, the chew portion having a second hardness substantially less hard than that of the first hardness; and
    a plurality of projections formed on and extending from the chew portion.

15. A pet chew toy, comprising:
    a unitary and rigid frame, the frame having a first hardness;
    a chew portion mounted on and supported by the frame, the chew portion having a second hardness substantially less hard than that of the first hardness; and
    wherein the chew portion further comprises a first base and a second base and a first portion of projections are formed on and extend from the first base and a second portion of projections are formed on and extend from the second base, the first portion of projections being arrange concentrically in bands of decreasin diameter on the first base and the second portion of projections being arranged concentrically in bands of decreasing diameter on the second base.

16. A pet chew toy, comprising:
    a unitary and rigid frame, the frame having a first hardness;
    a chew portion mounted on and supported by the frame, the chew portion having a second hardness substantially less hard than that of the first hardness; and
    wherein the chew portion further comprises a first base and a second base and a first portion of projections are formed on and extend from the first base and a second portion of projections are formed on and extend from the second base, each projection of the first and second portions of projections being generally cylindrical.

17. A pet chew toy, comprising:
    a frame portion formed of a polymer material, having a first bulbous end and a second bulbous end, the first end connected to the second end by a pair of arms, the pair of arms and the first and second ends defining an interior space; and
    a chew portion, formed of a polymer material, being nested in and filling the interior space of the frame portion, the chew portion having top and bottom sides and raised projections extending upwards from the top side and downwards from the bottom side;
    wherein only the top and bottom side of the chew portion have the projections.

* * * * *